April 25, 1944.  F. KIEFER  2,347,486
PRESERVATION OF COMESTIBLES
Original Filed Sept. 11, 1939
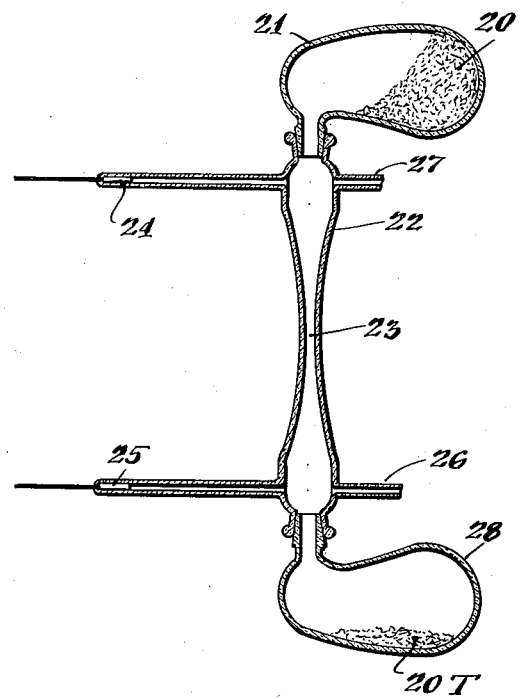
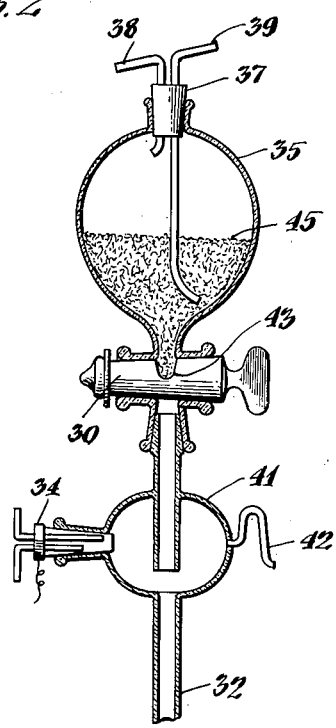
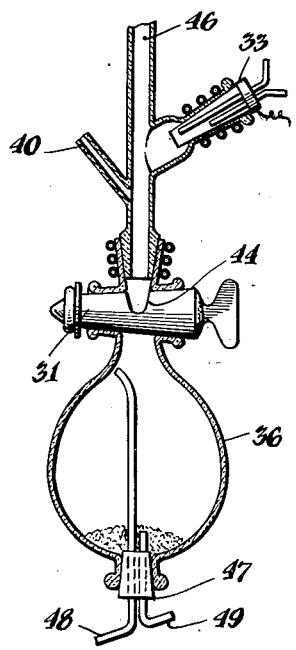
INVENTOR.
Felix Kiefer
BY
Furman Rinehart
ATTORNEY Patented Apr. 25, 1944

2,347,486

UNITED STATES PATENT OFFICE 2,347,486

PRESERVATION OF COMESTIBLES

Felix Kiefer, Flushing, N. Y.

Original application September 11, 1939, Serial No. 294,225. Divided and this application May 23, 1942, Serial No. 444,180

5 Claims. (Cl. 99—150)

This invention relates generally to preservation of comestibles. It relates more particularly to the treatment of products subject to oxidative deterioration and still more particularly to the treatment of comestibles susceptible to change resulting in rancidity.

This application is a division of my copending application, Serial No. 294,225, filed September 11, 1939, in which said copending application is disclosed various procedures for inhibiting rancidification of comestibles.

As pointed out in my said copending application, Serial No. 294,225, it is known that many compositions of matter, including various comestibles, turn rancid. This is particularly true of the food products containing fats or fat-like substances which undergo oxidative deterioration.

I have found that active hydrogen may be caused to react with the rancid-forming substances with resulting inhibition and retardation, or complete elimination of the undesirable oxidative deterioration of food products. This invention, therefore, comprehends a process and apparatus for the treatment of comestibles to inhibit rancidification.

My researches lead me to believe that the reaction of active hydrogen may find its explanation in the chemical changes which the rancid-forming substances undergo when they become rancid. As mentioned in the foregoing, rancidity is believed to be the result of oxidative change generally characteristic of fats and more frequently of such fats which, in their chemical structure, contain one or more unsaturated groups marked by double-bonds. Rancidity is preceded by an induction period during which oxygen is absorbed by the material without any substantial chemical reaction taking place at the outset.

The next step is marked by the combination of oxygen with the compounds containing the unsaturated link with consequent formation of a peroxide or ozonide. This step may take place under the influence of one or more catalysts which may be of an organic or inorganic nature, such as so-called enzymes, or certain metals or metal salts. Or, it may be brought about by chemically active light, such as ultraviolet, which is also part of the sunlight. Owing to the deleterious effect of active light, it has been common practice to protect products liable to oxidative deterioration by packaging them, with the purpose of keeping them in the dark or to shield them from the active light.

The peroxides and ozonides are very unstable and break apart where the oxygen addition has taken place. The ultimate result is that aldehydes, ketones and fatty acids are formed as fragments of the original fat. These, unlike the pure fats, are characterized by the odors and tastes typical of rancidity.

A somewhat different process may take place in the presence of certain bacteria which produce hydrolizing of the fat, i. e. breaking it apart into fatty acids and glycerin of which it is composed. These fatty acids thus formed may then also undergo oxidative deterioration as suggested above.

From the foregoing brief explanation of the rancidification of a fat, it may be postulated where inhibitive action should set in, in order to be effective. It is, first, at the compound itself, i. e. at its unsaturated links where it may add on oxygen; and, second, at those catalytic agents which would act as helpmates of the oxygen in its destructive action.

A still further approach, which, however, serves only in specific cases, is to destroy the bacteria heretofore mentioned in order to inhibit any lipolytic action originating indirectly from them.

With the foregoing in view, I aim according to the invention to cause a reaction between the rancid-forming substances whereby they may become stable against undesirable combination with oxygen. To accomplish the desirable results comprehended by the invention, I treat the products containing the rancid-forming substances with active hydrogen in order to bring about the desired reaction.

I believe further that when active hydrogen is brought into contact with some of the products which are subject to such oxidative deterioration as hereinbefore mentioned, it launches a severe attack at the catalytic agencies present in the deteriorative product; first, by reacting with substantially every trace of oxygen adsorbed in it; and, second, by reacting in certain cases with the catalysts themselves. Thus, the catalysts are rendered impotent to perform their usual function.

I have set forth an hypothesis for a theoretical explanation underlying my invention, and it will be understood that it is what I presently believe in the light of my researches. But whatever conclusion may be reached as to the possible mechanism, chemical, physical or both, involved, my invention comprehends the protective and preserving effect of the treatment of compositions of matter with active hydrogen to inhibit, retard or entirely eliminate oxidative deterioration or ransidification.

It will be understood in this connection that the term "active hydrogen" is intended to connote that form of hydrogen in which it can react directly with other elements or substances. While it is somewhat a matter of academic debate or discussion, it has been mostly identified with nascent hydrogen and with atomic hydrogen. But the various ways in which investigators have arrived at the form of active hydrogen is suggested by a number of different designations formulated as follows: H, $H^+$, $H_2^+$, $H_3$.

Nascent hydrogen or hydrogen ion is obtained, for example, when hydrogen is generated by chemical decomposition, such as from iron and hydrochloric acid. Atomic hydrogen is formed, for example, when molecular hydrogen is bombarded with electrons or active rays, whereby to break apart the molecules. The other forms may be more a matter of speculation; $H_2^+$ having been assumed to exist near the cathode in a low voltage discharge tube. $H_3$ has been considered as a rearrangement product of hydrogen under high voltage discharge at moderate vacuum. It is so written because of its resemblance, as to high reactivity, to ozone.

As further pointed out in my said copending application, Serial No. 294,225, the invention lends itself to the treatment of comestibles in various apparatuses. This application is directed more particularly to the treatment of comestibles by bringing them into reactive contact with active hydrogen formed by subjecting hydrogen gas to various forms of electric discharges.

Although the novel features which are believed to be characteristic of this invention will be particularly pointed out in the claims appended hereto, the invention itself, as to its objects and advantages, and the manner in which it may be carried out, may be better understood by referring to the description with reference to certain of the following examples taken in connection with the accompanying drawing forming a part hereof, in which Fig. 1 is a view in elevation of a glass electric discharge apparatus in which the invention may be practiced; and Fig. 2 is a view in elevation of a different form of electric discharge apparatus in which the invention may be practiced.

The following examples are illustrative of the manner of practicing the invention.

*Example I*

This example describes the stabilization treatment applied to toasted wheat flakes after manufacture in the ordinary manner wherein the toasted cereal is brought into reactive contact with active hydrogen prepared from hydrogen gas by exposing it to an electric discharge in a modified Geissler tube (vacuum discharge tube) such as shown in Fig. 1.

The toasted and dried wheat flakes designated 20 (Fig. 1) were placed in an upper chamber 21 connected with a tube 22 providing a discharge zone 23. Suitable aluminum electrodes 24 and 25 were connected through a luminous tube transformer (not shown) of 9000 volts and 30 milliamperes output, which in turn received its current from a 110 v. A. C. 60 cycle circuit. A hydrogen gas inlet 26 is located near the bottom end of tube 22 and connected to a suitable source (not shown) of hydrogen gas. A gas outlet port 27 is connected to a suction pump (not shown) to produce a partial vacuum in the electric discharge zone 23. A collecting chamber 28 for treated product (designated 20T) is connected to the lower end of tube 22.

To process the material 20, discharge zone is put under high vacuum (1–10 mm. Hg. residual pressure) and flushed twice or three times with hydrogen. After this, the hydrogen flow is reduced to a volume to maintain the vacuum indicated. Current is caused to flow through the electrodes 24 and 25 to provide the electric discharge in zone 23. While the discharge is passing through the tube, the cereal 20 is caused to pass through the discharge zone where it is brought into reactive contact with the active hydrogen thus produced. The treated product is collected in the lower chamber 28.

It was observed that this treatment improved the stability of the cereal against rancidification more than 100% by comparative test.

*Example II*

In order to treat cereal such as toasted wheat flakes with a higher moisture content, and yet to maintain a high vacuum in the discharge zone, a modified form of apparatus may be employed, such, for example, as that shown in Fig. 2. It is characterized by two large stop cocks, a feeder stop cock 30 positioned near the upper end of the apparatus, and a receiver stop cock 31 near the lower end. A tube 32 is connected with the stop cocks and is provided with an aluminum electrode 33 near its lower end and an aluminum electrode 34 near its upper end. The electrodes are connected to a suitable source of current through a transformer (not shown) as described in the foregoing. The upper stop cock 30 is connected to a material supply chamber 35 and the lower stop cock 31 is connected to a receiving chamber 36 for treated material. The feed chamber 35 is normally closed by a stopper 37. It is provided with an hydrogen inlet port 38 and an outlet port 39 which may be connected to a suction pump (not shown).

Near the lower end of tube 32 is provided a hydrogen gas feed port 40, which may be connected to a suitable source of hydrogen (not shown). The upper end of the tube 32 is provided with an expanded part providing a surge chamber 41 to which the electrode 34 is connected. The chamber 41 is also provided with a gas outlet port 42 which may be connected with a suction pump (not shown). Stop sock 30 is provided with a feed cup 43, and stop cock 31 with a receiving cup 44.

This device may be operated as follows: Material 45 to be treated is placed in the chamber 35 and closed by the stopper 37. Chamber 35 may be flushed with hydrogen gas through inlet port 38 and then put and maintained under vacuum.

Hydrogen gas is passed into tube 32 through port 40 and the discharge zone 46. The tube is maintained under vacuum as described in the foregoing. Suitable current is passed through the electrodes 33 and 34, thus to provide the electric discharge zone. A quantity of material under vacuum is collected in the feeding cup 43 from which it may be transferred under vacuum to the discharge zone 46 by turning the stem of stop cock 30. Thus there is provided a transfer mechanism from the charging chamber under vacuum to the vacuum tube where it is caused to pass through the discharge zone into reactive contact with the active hydrogen therein. The treated material may be collected in receiving cup 44 from whence it may be transferred to the receiving chamber 36 for the treated product without materially disturbing the vacuum in the discharge tube 32. If desired, the receiving chamber 36 may be maintained under vacuum by means of stopper 47 and ports 48 and 49 connected to a suitable source of vacuum.

This apparatus has been successfully used for the treatment not only of cereal flakes to improve stabilization against rancidification, but also for the treatment to improve the stability of dry milk and ground roasted coffee.

*Example III*

A quantity of whole dry milk (powdered milk), which due to exposure to heat and atmospheric oxygen had assumed a noticeable "buttery" odor, was passed through the vacuum discharge tube containing an atmosphere of hydrogen, according to a procedure described in the foregoing. After this treatment, the odor of the milk was restored to its original freshness and was maintained over a long storage period.

It will be seen from the foregoing description that my invention as disclosed in this application comprehends the treatment of comestibles and the like, which contain rancid forming substances, by bringing them into reactive contact with hydrogen rendered active by subjecting it to treatment in an electric discharge zone.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a process of preserving from oxidative deterioration toasted cereal flakes containing substances susceptible of turning rancid, the step which comprises contacting said toasted flakes with an active hydrogen which has been rendered active in an electric discharge zone under partial vacuum, to cause a reaction between said active hydrogen and the rancid forming substances in said flakes to inhibit subsequent oxidative deterioration of said cereal flakes.

2. In a process of preserving from oxidative deterioration a comestible in form of solid particles containing substances susceptible of turning rancid, the method which comprises maintaining an electric discharge zone under partial vacuum, maintaining in said zone hydrogen gas whereby to produce active hydrogen and contacting the active hydrogen with said solid particles.

3. In a process of preserving from oxidative deterioration dried milk containing substances suscepticle of oxidative deterioration, the method which comprises maintaining an electric discharge zone under partial vacuum, passing hydrogen gas through said zone whereby to produce active hydrogen, and causing said dried milk to pass through said zone in contact with the active hydrogen, whereby to cause said active hydrogen to react with said substances to inhibit subsequent oxidative deterioration of the comestible.

4. A process of preserving from oxidative deterioration a comestible composition of matter in the form of solid particles containing substances susceptible of oxidative deterioration which comprises passing hydrogen gas through a zone maintained under a vacuum of from 1 to 10 mm. of mercury wherein is provided electric discharges to render said hydrogen active, causing the comestible to pass through said zone in reactive contact with the hydrogen rendered active and out of contact with electrodes whereby to cause rancid forming substances in said comestible to react with said active hydrogen thereby to produce said comestible in a form which preserves it from oxidative deterioration and then collecting the comestible after it has been passed through said electric discharge zone.

5. A process of preserving from oxidative deterioration a ground roasted coffee containing substances susceptible of oxidative deterioration which comprises passing hydrogen gas through a zone maintained under partial vacuum wherein is provided electric discharges to render said hydrogen active, causing the ground coffee to pass through said vacuum zone in reactive contact with the hydrogen rendered active and out of contact with electrodes whereby to cause rancid forming substances in said coffee to react with said active hydrogen thereby to produce said coffee in a form which preserves it from oxidative deterioration and then collecting the coffee after it has been passed through said electric discharge zone.

FELIX KIEFER.